United States Patent
Thiel et al.

(10) Patent No.: US 7,118,098 B2
(45) Date of Patent: Oct. 10, 2006

(54) HYDRAULICALLY SEALED CROSSFLOW MASS TRANSFER TRAY

(75) Inventors: Joachim Thiel, Neustadt (DE); Ulrich Hammon, Mannheim (DE); Bernd Gerber, Ludwigshafen (DE); Helmut Jansen, Dormagen (DE); Björn Kaibel, Hilden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 354 days.

(21) Appl. No.: 10/459,620

(22) Filed: Jun. 12, 2003

(65) Prior Publication Data
US 2004/0097756 A1    May 20, 2004

(30) Foreign Application Priority Data
Sep. 19, 2002   (DE) ................ 102 43 625

(51) Int. Cl.
*B01F 3/04* (2006.01)
(52) U.S. Cl. ............... 261/114.2; 261/114.5; 203/71
(58) Field of Classification Search .. 261/114.1–114.5; 202/158; 203/71
See application file for complete search history.

(56) References Cited

U.S. PATENT DOCUMENTS

| | | | | |
|---|---|---|---|---|
| 1,620,750 A | * | 3/1927 | Bartlett | 261/114.1 |
| 2,045,518 A | * | 6/1936 | Chatfield | 261/114.2 |
| 2,753,166 A | | 7/1956 | Bergman | |
| 3,047,278 A | * | 7/1962 | Hans-Peter | 261/114.3 |
| 3,053,520 A | * | 9/1962 | Hans-Peter | 261/114.5 |
| 4,744,929 A | * | 5/1988 | Robinson et al. | 261/97 |
| 6,498,272 B1 | | 12/2002 | Schröder et al. | |

FOREIGN PATENT DOCUMENTS

| | | |
|---|---|---|
| DE | 1 091 533 | 10/1960 |
| DE | 1 096 870 | 1/1961 |
| DE | 3314827 A1 * | 10/1984 |
| DE | 199 24 532 | 11/2000 |
| FR | 779 167 | 3/1935 |
| GB | 721 247 | 1/1955 |

OTHER PUBLICATIONS

Broschüre "Montz", Die Julius Montz Gmbh, Apparate FüDie Chemische Industrie, pp. 58-59, 2002.
K. Hoppe, et al., Technische Fortschrittsberichte, vol. 61, pp. 66-73, "Grundlagen Der Dimensionierung Von Kolonnenboden", 1967.

* cited by examiner

*Primary Examiner*—Scott Bushey
(74) *Attorney, Agent, or Firm*—Oblon, Spivak, Maier & Neustadt, P.C.

(57) ABSTRACT

A hydraulically sealed crossflow mass transfer tray, separating columns which contain the hydraulically sealed crossflow mass transfer tray and the use of such separating columns for thermal separating processes.

11 Claims, 12 Drawing Sheets

HYDRAULICALLY SEALED CROSSFLOW MASS TRANSFER TRAY

The present invention relates to a hydraulically sealed crossflow mass transfer tray which is suitable as an internal in separating columns for mass transfer between liquid and gas phases, and has separated channels arranged in parallel to one another which conduct the liquid, and gas passages arranged between the channels which are covered by long hoods whose two lower longitudinal edges dip into the liquid of the channels and have gas exit slots having directing surfaces which direct the gas exit into the liquid in an oblique direction, in order to generate the direction of the liquid streams in the channels, the longer side of the hoods being aligned at right angles to the crossflow direction of the liquid. This group of mass transfer trays includes, for example, the Thormann® trays disclosed by the technical literature.

The present invention further relates to separating columns which comprise at least one such mass transfer tray and also to the use of such separating columns for thermal separating processes.

The results of chemical reactions are generally not pure substances but instead substance mixtures from which the target components have to be removed.

Frequently, separating processes which are carried out in separating columns are used for this purpose. In these separating columns, gaseous and liquid streams are conducted in co- or in countercurrent and, as a consequence of inequilibrium existing between the streams, heat and mass transfer takes place which eventually results in the desired separation in the separating column. In this document, such separating processes are to be referred to as thermal separating processes.

Examples of thermal separating processes include fractional condensation (cf. DE-A 19924532) and/or rectification (rising vapor phase is conducted in countercurrent to falling liquid phase; the separating effect is based on the vapor composition in the equilibrium being different to the liquid composition), absorption (a gas and a liquid are conducted in co- or countercurrent; the separating effect is based on the different solubility of the gas components in the liquid), stripping (like absorption, except that the liquid phase is laden with a component which is taken up by the stripping gas) and desorption (the reverse process to absorption; the gas dissolved in the liquid phase is removed by partial pressure reduction).

In general, the abovementioned separating columns comprise internals which fulfill the purpose of increasing the surface area for the heat and mass transfer effecting the separation in the separating column.

Examples of such internals include structured packings, random packings and/or mass transfer trays.

Mass transfer trays fulfill the purpose of providing locations having continuous liquid phases in the separating column in the form of liquid layers. The surface of the vapor or gas stream rising, for example, in the liquid layer and thus distributing itself within the continuous liquid phase is then the decisive exchange surface.

The mass transfer trays used are particularly frequently those having forced liquid flow.

The forced liquid flow is achieved by the mass transfer trays having at least one downcomer (drain), through which the liquid flows from the upper tray to the lower tray (feed) irrespective of the flow path of the vapor in a tray column. The horizontal liquid flow over the transfer tray from feed to drain is selected according to the task in terms of process engineering. The gas or the vapor passes through the open cross sections of the tray.

When the liquid is conducted over the tray in reverse flow (feed and drain of the mass transfer tray are arranged on the same side of the tray), the tray is referred to as a reverse flow tray. In the case of radial flow trays, the liquid flows radially on the tray from the middle (feed) to the drain at the edge of the tray.

In the case of crossflow trays, the liquid, viewed over the entire flow area, is conducted transversely over the tray from the feed to the drain. In general, crossflow trays are of a single-flow design. In other words, feeds and drains are arranged on opposite sides of the tray. However, they may also be of double-flow (or more than double-flow) design. In this case, the feed may be, for example in the middle and a drain may be arranged on each of the opposite sides of the mass transfer tray.

Hydraulically sealed crossflow trays are notable in that they cannot empty when the column is shut down, disregarding the tiny emptying drillhole (its cross section is normally more than 200 times smaller than the total cross section of the passages) which every crossflow tray has for reasons of practicability.

In other words, even at low column loadings, hydraulically sealed crossflow trays have accumulated liquid (reflux and/or inlet liquid) and are at no risk of running dry. This results from the fact that the passages of hydraulically sealed crossflow trays are not chimneyless drillholes, as is the case, for example, in dual-flow trays, sieve trays and valve trays. Rather, each passage leads into a chimney which prevents the tray from running dry. Above the chimney, vapor deflecting hoods (bells) are mounted which are immersed in the accumulated tray liquid. Frequently, the vapor deflecting hoods are slotted or serrated at their edges (i.e. they have transport slots). The vapor stream rising in the passage is deflected by the vapor deflecting hoods and flows parallel to the tray, i.e. at right angles to the column, into the accumulated liquid.

The vapor bubbles leaving neighboring hoods generally distributed equidistantly over the tray form a froth layer in the accumulated liquid.

Drainpipes or drain segments which leave the trays, generally to the left or to the right in alternation, supported by weirs, control the liquid level of the mass transfer trays and feed the liquid to the next tray down. It is essential for the hydraulic sealing effectiveness that the drainpipes or drain segments of the upper tray are immersed in the accumulated liquid of the tray lying below it. There are preferably no inlet weirs. Bubble-caps which can be adjusted in height allow adaptation to the flow conditions and the equalization of immersion depths in the event of production irregularities, so that all bubble-caps of the tray have uniform gas flow.

Depending on the design and arrangement of the bubble-caps, the hydraulically sealed crossflow trays designed with single flow are divided, for example, into round bubble-cap trays (passage, chimney and bubble-cap are round), tunnel-cap trays (passage, chimney and bubble-cap are rectangular, the bubble-caps are arranged in succession with the longer rectangular edge lying parallel to the crossflow direction of the liquid) and Thormann trays (passage, chimney and bubble-cap are rectangular, the bubble-caps are arranged in succession with the longer rectangular edge aligned at right angles to the crossflow direction of the liquid).

Thormann trays are described, for example, in DE-A 19924532, in the brochure "Montz, Ihr Partner in der Verfahrenstechnik", from Julius Montz GmbH, Apparate für die chemische Industrie, D-40705 Hilden, 2002, pages 58 and 59, and in Technische Fortschrittsberichte, Volume 61, Grundlagen der Dimensionierung von Kolonnenböden, Verlag Theodor Steinkopf, Dresden, 1967, pages 66 to 73.

Between any two hoods of a Thormann tray arranged in succession in the crossflow direction, there is a channel in which the liquid flows. It is characteristic of Thormann trays that the liquid flows in countercurrent in any two successive channels in the crossflow direction. This forced flow is effected by the vapor which emerges from appropriately bent, sawtooth-like slots having directing surfaces.

The use of Thormann trays is advantageous in particular at high vapor loadings. The low pressure drop favors the use of Thormann trays under reduced pressure. A further advantage of Thormann trays is that they can still be operated stably at comparatively low liquid loadings. However, a disadvantage of Thormann trays is that their degree or effectiveness and the stability of their operation, in particular at high liquid loadings, is not completely satisfactory. High liquid loadings occur in particular in those separating columns which are configured for large capacities. These are generally separating columns having large diameters. In this context, large diameters are in particular diameters of ≧4 m, e.g. from 4 m to 8 m or up to 10 m.

It is an object of the present invention to provide crossflow mass transfer trays which, on the one hand, have the advantages of Thormann trays, but, on the other hand, only have the abovementioned disadvantages to a reduced extent, if at all.

In particular, the improved crossflow mass transfer trays should be suitable to replace the hydraulically sealed crossflow trays having an increased degree of effectiveness recommended for the separating problem of DE-A 19924532 in the abovementioned document. The abovementioned requirement profile should in particular be fulfilled with regard to the implementation example of DE-A 19924532.

A hydraulically sealed crossflow mass transfer tray (1) has therefore been found which is suitable as an internal in separating columns for mass transfer between liquid and gas phases, and has separated channels (6) arranged in parallel to one another which conduct the liquid, and gas passages (7) arranged between the channels which are covered by long hoods (4) whose two lower longitudinal edges (4a) dip into the liquid of the channels (6) and have gas exit slots (5) having directing surfaces (5a) which direct the gas exit into the liquid in an oblique direction, in order to generate the direction of the liquid streams in the channels, the longer side of the hood being aligned at right angles to the crossflow direction of the liquid, wherein, the directing surfaces (5a) of the hoods (4) in at least two consecutive channels (6) in the crossflow direction are aligned in such a way that the liquid in these channels flows in the same direction (the numerical addresses refer to FIGS. 4 to 11), and the liquid is otherwise conducted in a meandering manner over the totality of the channels.

A sequence of channels having the same liquid flow direction which is present in the crossflow direction and is not interrupted by any channel having the opposite flow direction is to be referred to in this document as a tray region (13).

According to the invention, a tray region necessarily comprises at least two channels. In general, a tray region will not comprise more than six channels. Frequently, a tray region also comprises three or four, sometimes five, channels.

According to the invention, it is further advantageous when directing plates (17) which project over the hood are secured to the upper side of at least some hoods of the hydraulically sealed crossflow mass transfer tray according to the invention. It is advantageous when the directing elements (directing plates) are mounted on at least those hoods which separate tray regions of opposite flow direction from each other. In general, the surface of the directing elements forms a right angle with the hood end.

In general, the channels in the hydraulically sealed crossflow mass transfer trays according to the invention are interrupted by cross-channels (9) at right angles to the channels.

According to the invention, it is advantageous when the cross-channels have narrowings where two tray regions having opposite flow direction border each other. In the extreme case, the narrowing may be joined to form a barrier.

In the simplest case, these narrowings may be formed by gas passages and/or hoods arranged closer to one another at the end side. In the abovementioned extreme case, this variant would involve two gas passages and hoods being joined to form a single (longer) gas passage and hood at the end side.

The breadth B between the lower longitudinal edges of a hood is adapted to the gas loading contemplated.

In general, B is from 2 cm to 20 cm or up to 30 cm, frequently from 4 cm to 8 cm.

The longitudinal sides of the gas passages and/or hoods are generally from 5 cm to 200 cm, frequently from 10 cm to 100 cm.

An improved liquid feed to subsequent channels is achieved when the upper side of the hoods has a flattening toward the end at at least one end of the hood.

Adjustment of the angle α (>0 and ≦90°) between directing surface and longitudinal side of the hood allows excessively high gas flow rates and excessively high liquid flows resulting therefrom to be counteracted. The smaller the angle (i.e. the wider the setting of the gas exit slot), the greater the liquid flow.

Some specific embodiments of the invention are illustrated in FIGS. 4 to 12 and are described in detail hereinbelow.

Figure 1A:
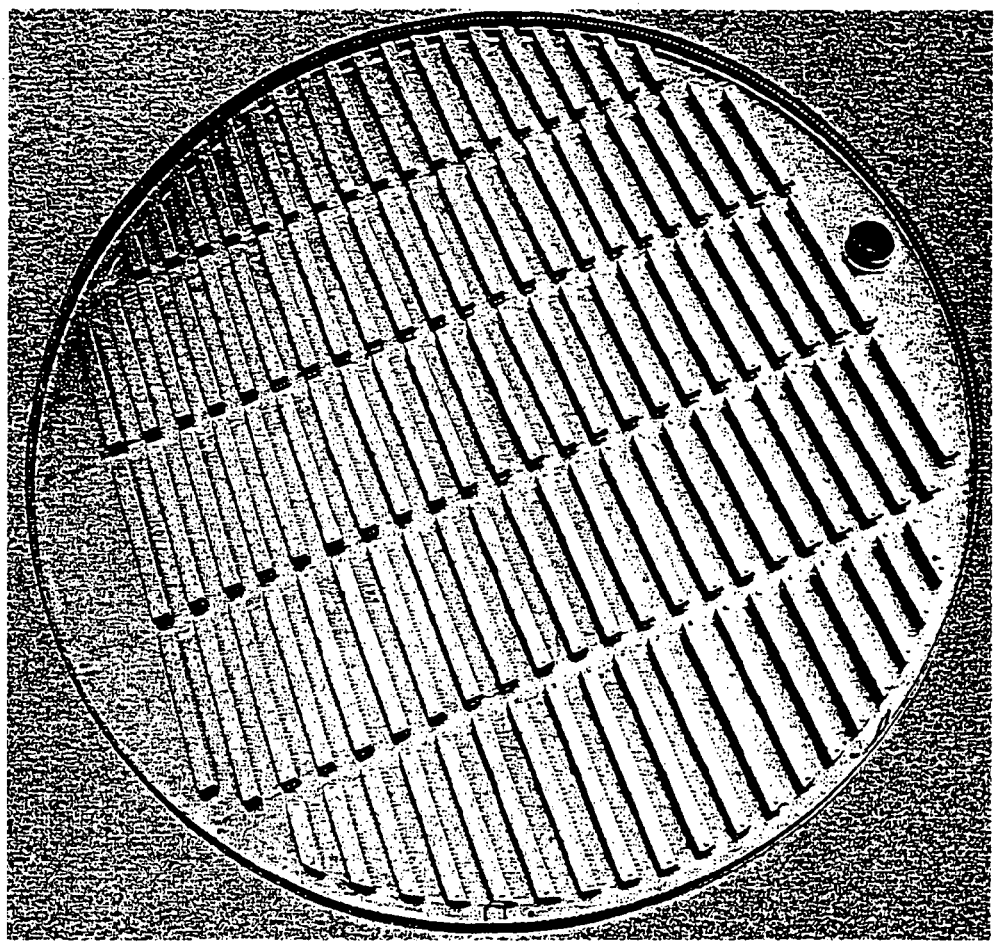
FIGS. 1a and 1b show the plan view of a Thormann tray.
Figure 1B:
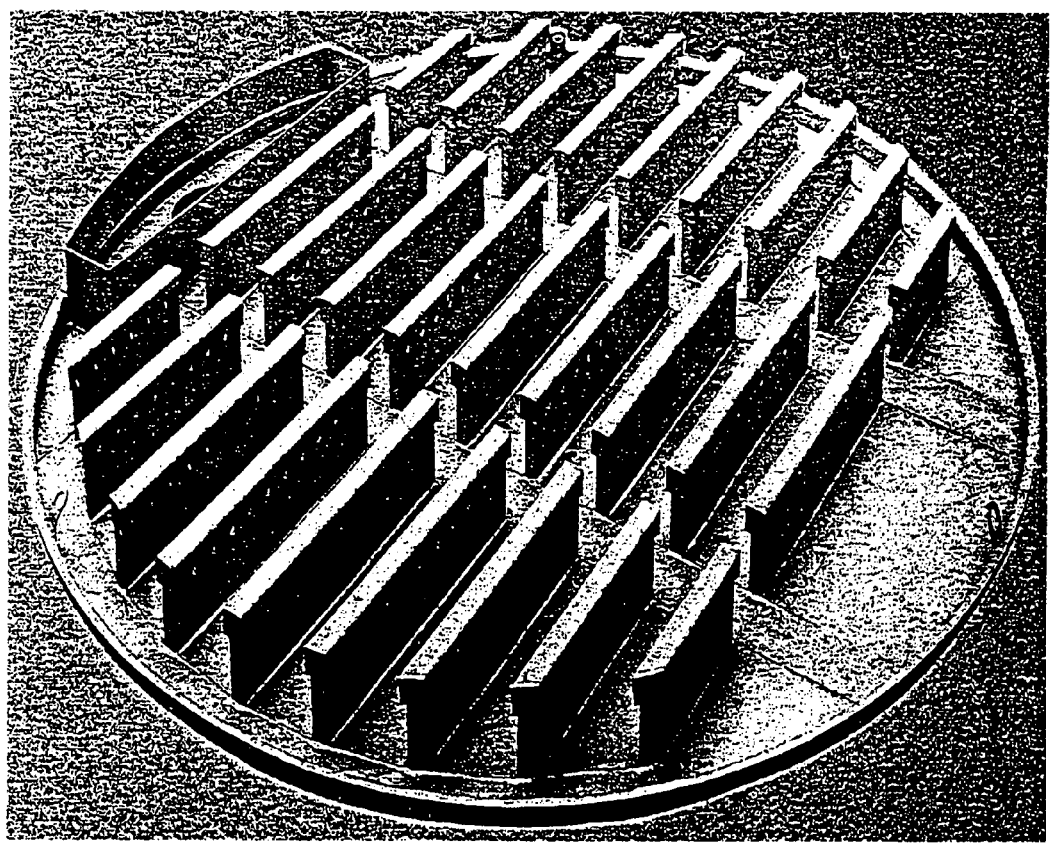
Figure 2:
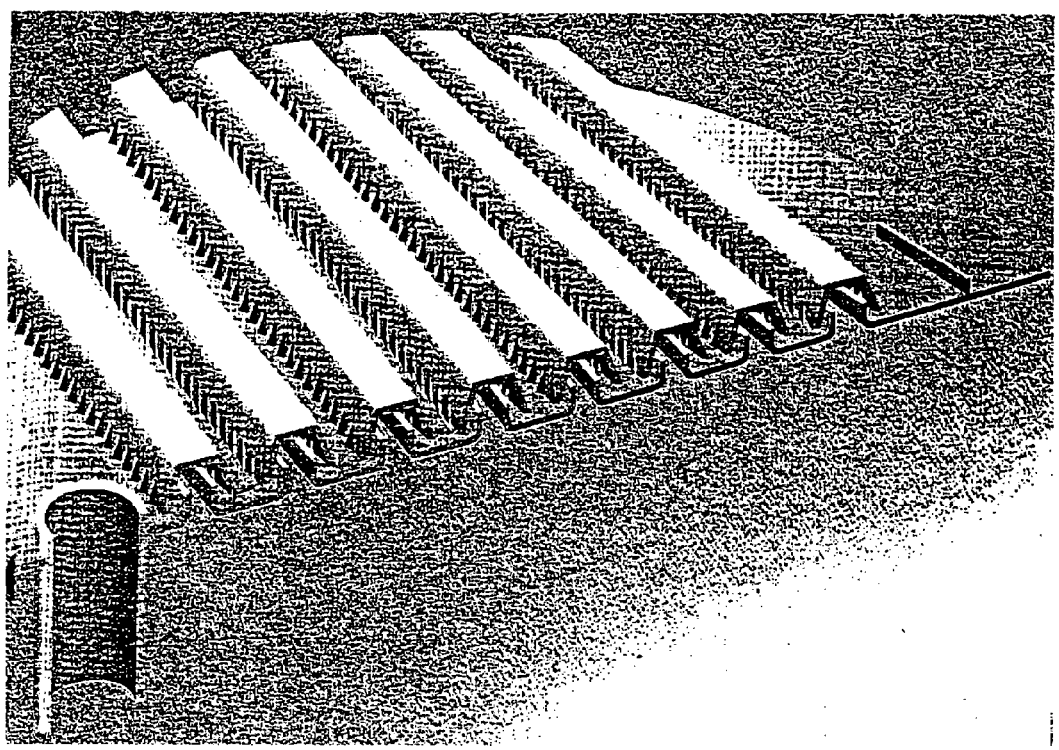
FIG. 2 shows a cross section through Thormann hoods and vapor chimneys.
Figure 3:
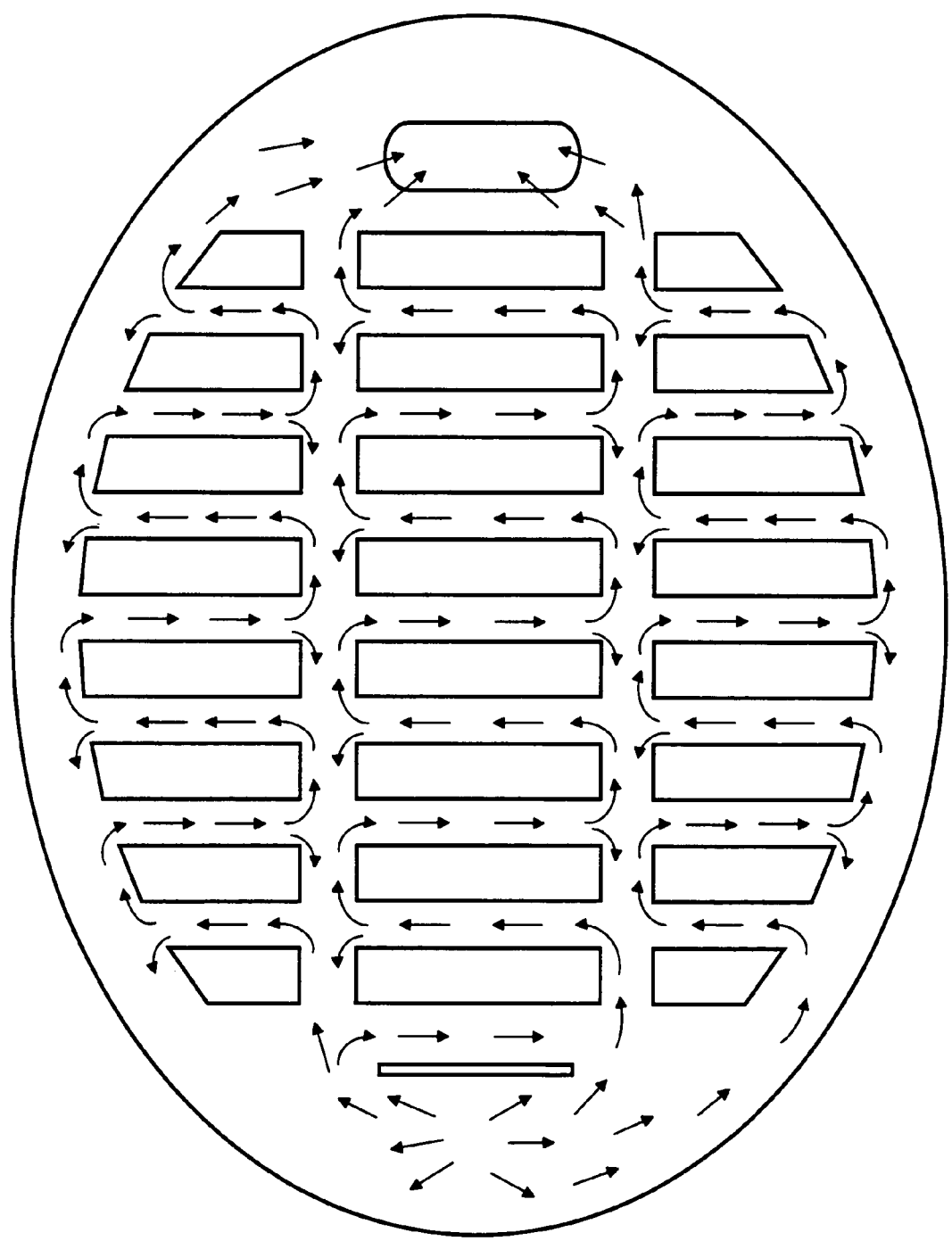
FIG. 3 shows the directed liquid flow on a Thormann tray which is effected by the arrangement of the hoods in combination with the special vapor slots.
Figure 4:
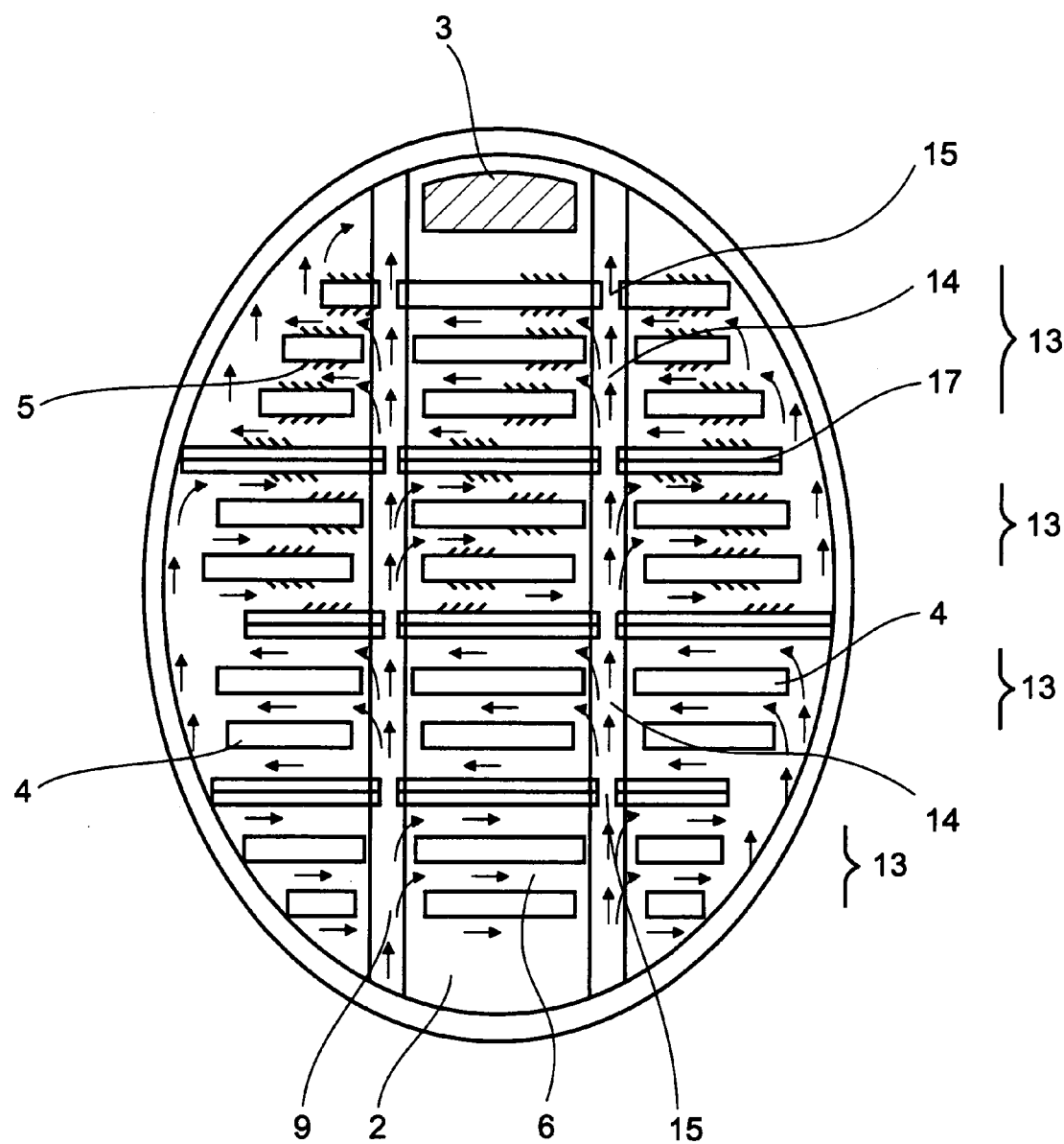

FIG. 4 shows a plan view of the directed liquid flow on a crossflow mass transfer tray according to the invention.

Figure 5:
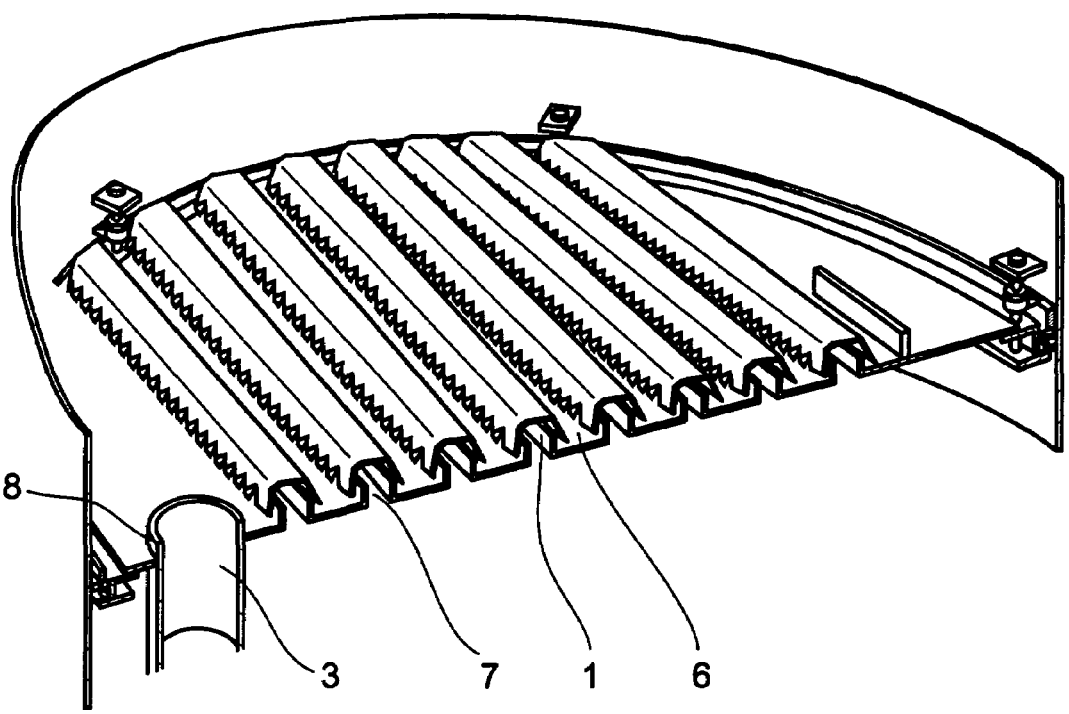

FIG. 5 shows a perspective view of part of a mass transfer tray according to the invention.

Figure 6:
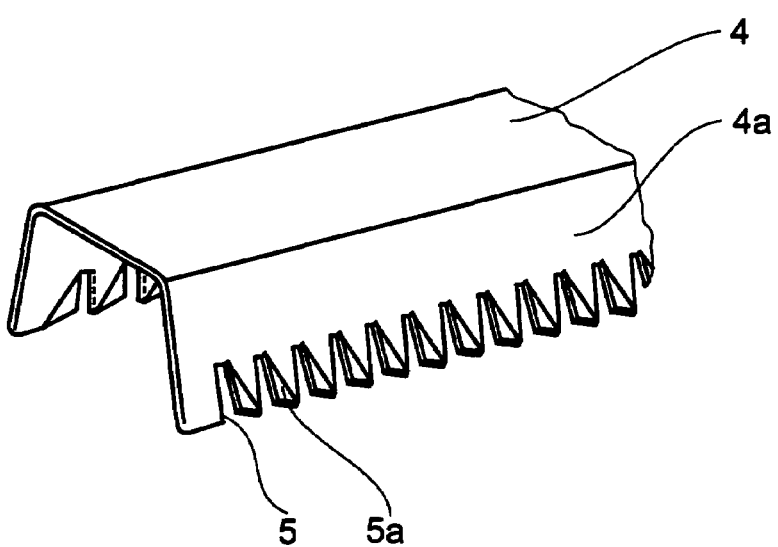

FIG. 6 shows a perspective view of a hood of a mass transfer tray according to the invention.

Figure 7:
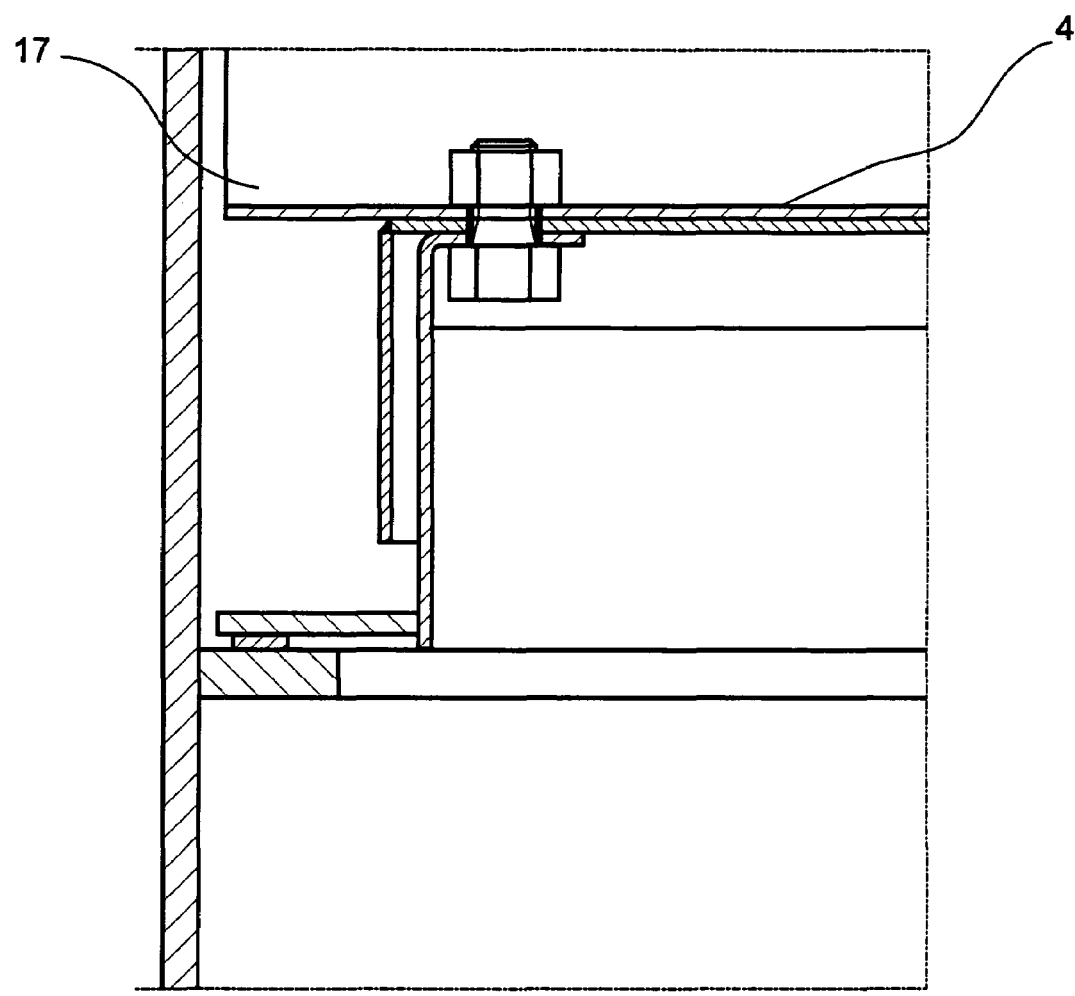

FIG. 7 shows a vertical longitudinal section through a hood having directing element and the tray.

Figure 8:
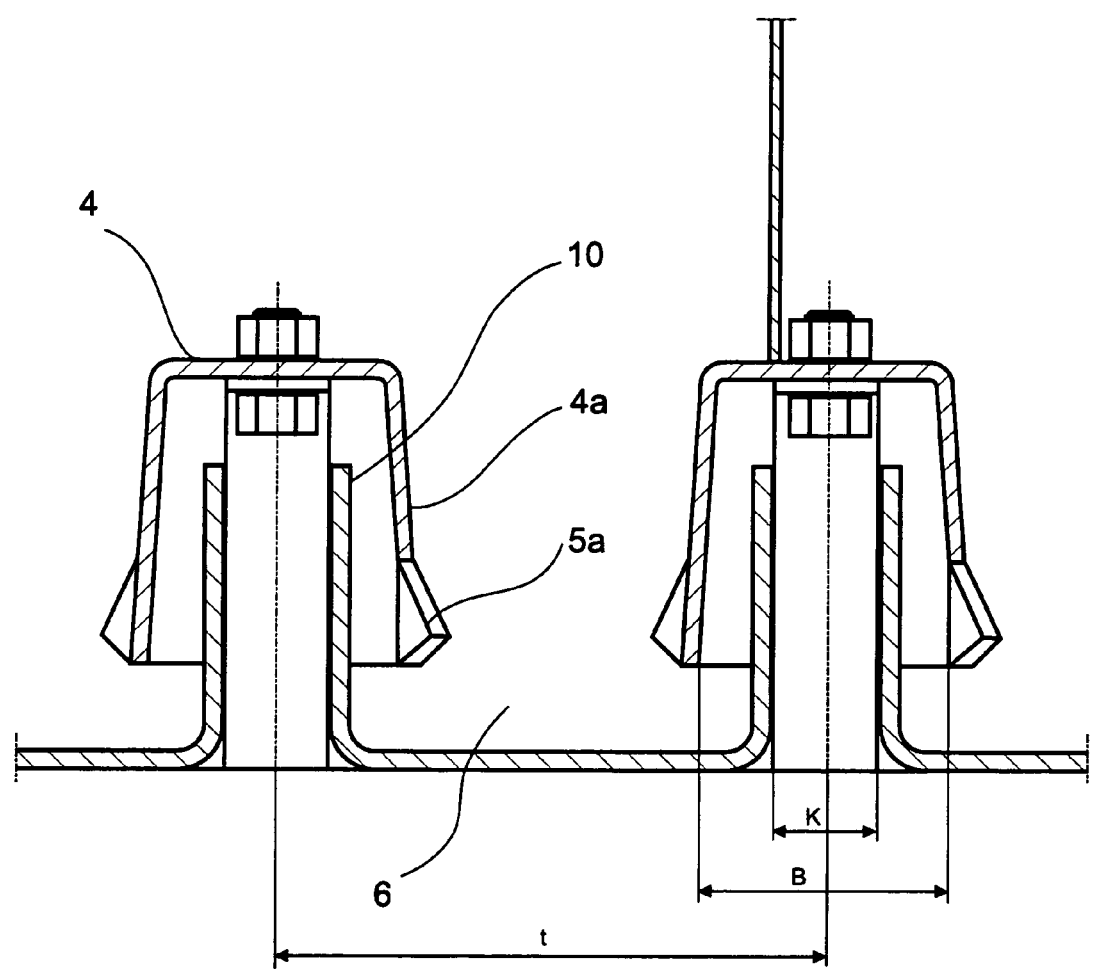

FIG. 8 shows a vertical cross section through a hood and the tray.

Figure 9:
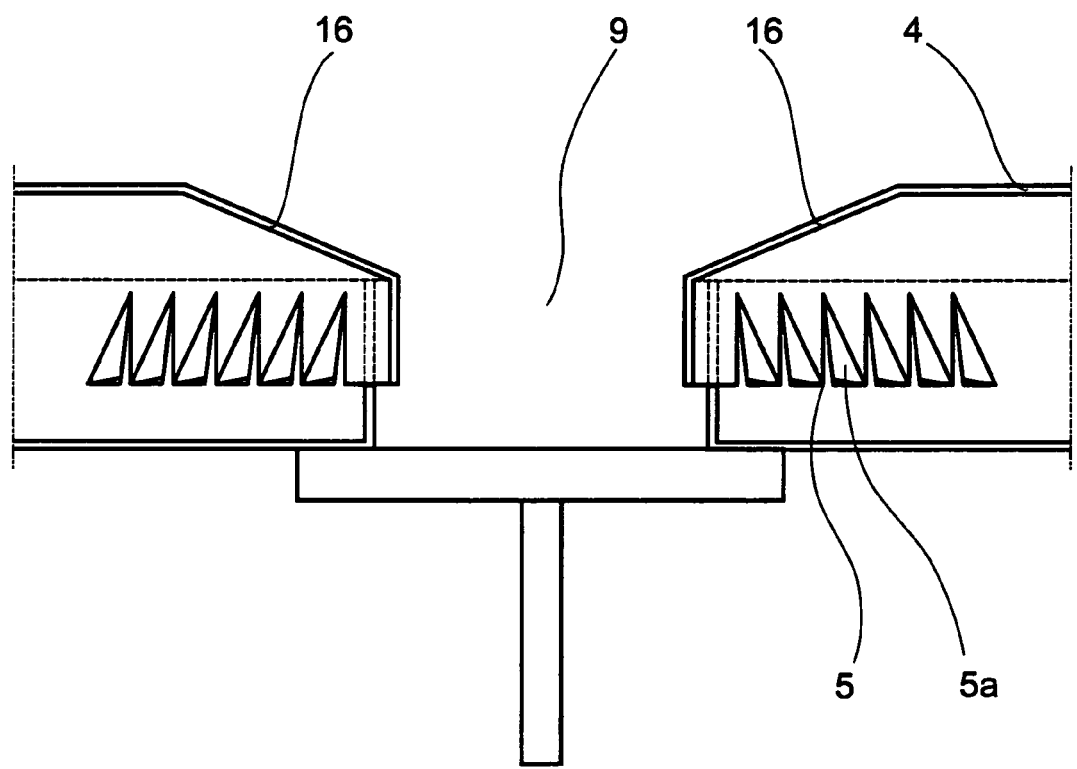

FIG. 9 shows a vertical longitudinal section in the region of two hood ends having a flattening which form a liquid passage between them.

Figure 10:
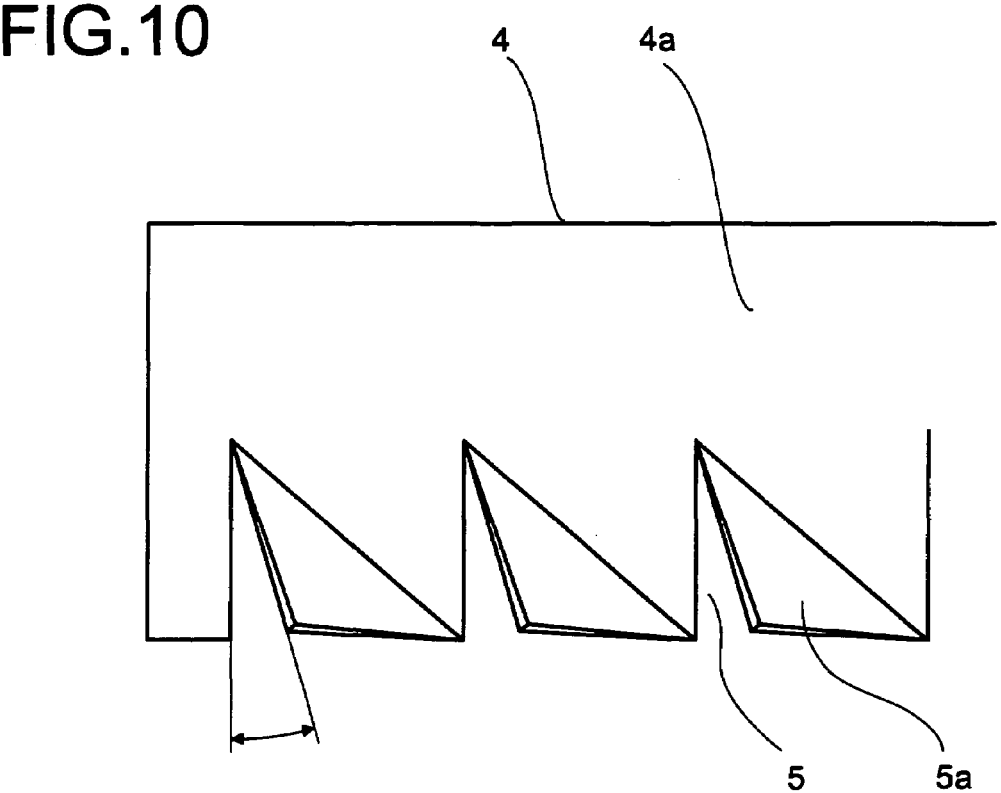

FIG. 10 shows a side view of the directing surfaces of a hood whose setting angle can be adapted to the task.

Figure 11:
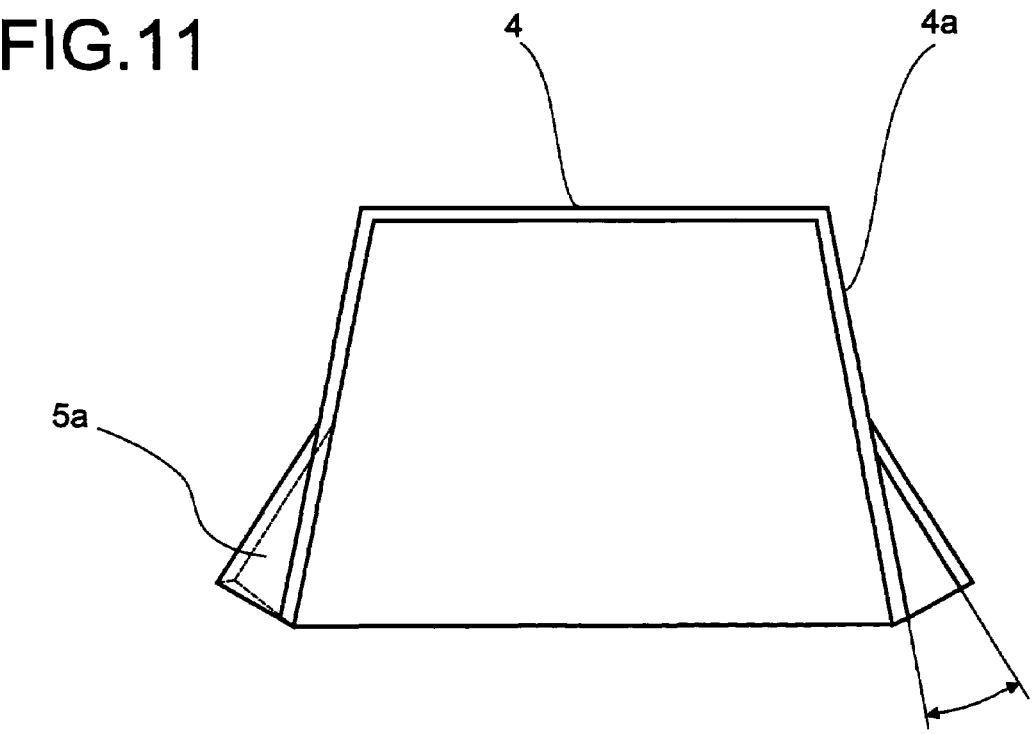

FIG. 11 shows a cross section through a hood having directing surfaces of a hood whose setting angle can be adapted to the task.

Figure 12:
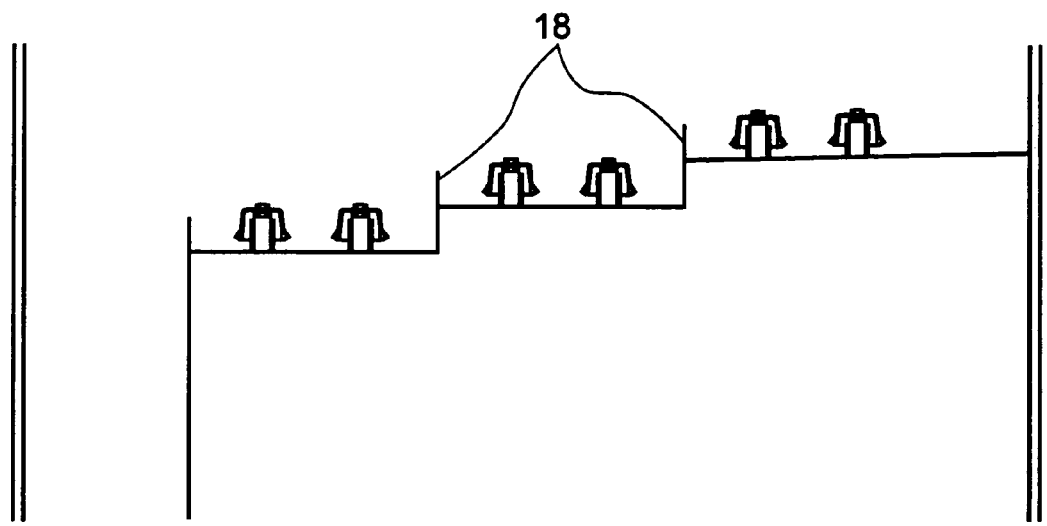

FIG. 12 shows a cascade-shaped implementation of the mass transfer tray according to the invention.

Figure 13:
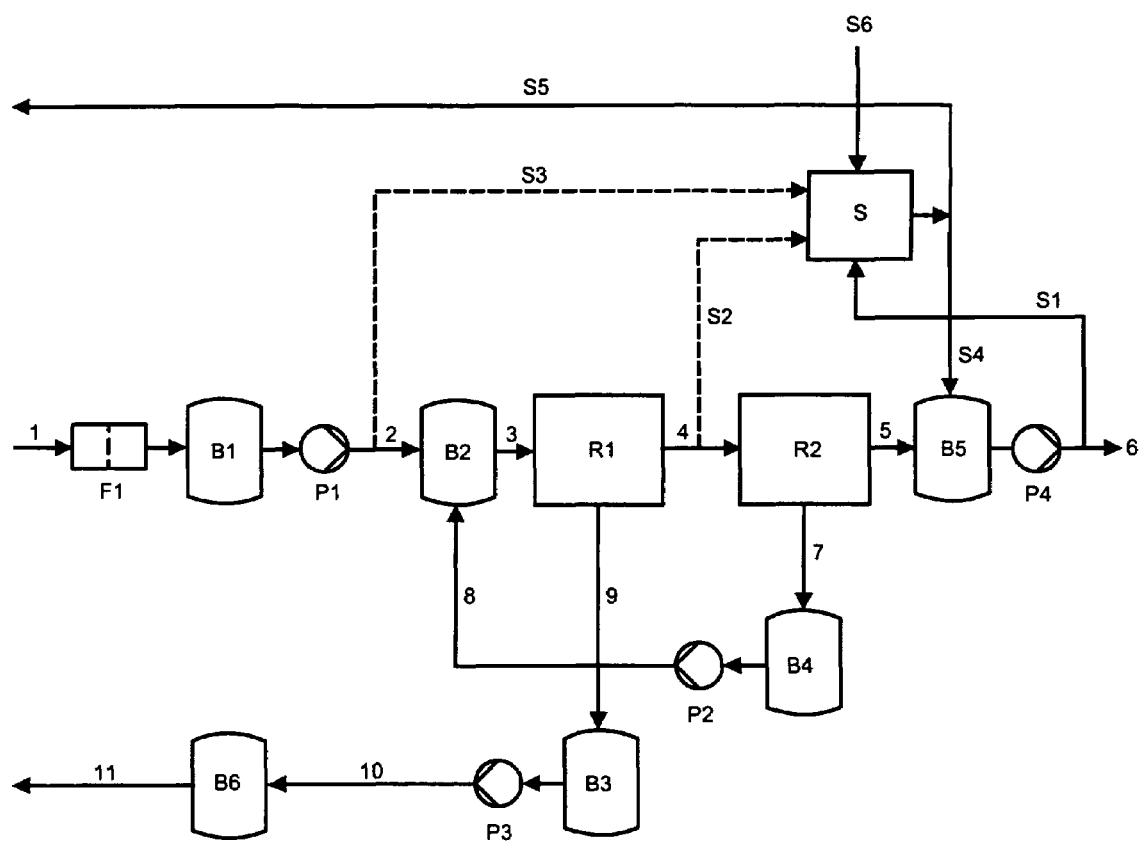

FIG. 13 is a block diagram indicative of a falling film crystallization process in accordance with the present invention.

The tray 1 illustrated in FIGS. 4 to 8 has a tray sheet which has a multiplicity of parallel, elongated, slot-shaped gas passages 7 as vapor chimneys. The longitudinal edges on the vapor chimneys are arranged perpendicular to the line connecting the feed surface 2 to the downcomer 3 and their side walls 10 form channels 6 through which the liquid is conducted. Above the vapor chimneys are disposed hoods 4 which have specially shaped gas exit slots 5 in their side walls 4a which project into the channel 6 and therefore into liquid.

One edge of each gas exit slot 5 forms an obliquely directing surface 5a, through which the gas is bubbled into the liquid in a directed manner, in order to generate a directed flow of the liquid in the channel 6. The angle of the directing surfaces 5a can be adjusted to adapt them to the task. For high gas flow rates, the angle α is increased and the liquid flow in the channels 6 is thus reduced. In addition, adaptation may be carried out via the number of slots. The flow channels 6 formed by the slotted hoods conduct liquid from the feed surface 2 to the downcomer 3. The overflow edge 8 at the downcomer and the vapor chimney height ensure a liquid level on the tray extending to above the slot 5. The gases or vapors rise from below through the vapor chimneys 7 into the hood 4 and pass through the slots 5 into the liquid which transfers flow momentum to them.

According to the invention, a plurality of successive hood lines 4 in the crossflow direction have the same flow direction. Such alignment of the directing surfaces 5a at the gas exit slots 5 in a plurality of successive hood lines and changing of the separations 9 between hoods 4 disposed in a line allows the liquid flow of the mass transfer tray according to the invention to be adapted to large column diameters in an ideal manner. In addition, the lower hood breadth B is increased at a high gas burden.

The mounting of vertical, usually flat, directing elements 17 on the hoods 4 reduces overflow of the hoods by liquid. Apart from this, the increased degree of effectiveness of the mass transfer tray according to the invention is attributed to the fact that it has the following properties:

narrow residence time distribution;

minimum backmixing;

good approximation to plug flow.

At high gas flow rates occurring in the slots 5 at extreme gas loadings, it is possible, if required, to counteract them by varying the geometry of the hood and by using deentrainer elements above the hoods (for example the accommodation of structured packings or beds of random packings between the trays).

In order to improve the liquid feed to the subsequent channels in the passage areas 9 between the top ends of two hoods 4, the ends or top sides of the upper sides of the hoods 4 may be flattened in the form of oblique flattenings 16 extending down to the ends. In one embodiment of the mass transfer tray according to the invention, the gas passages in the crossflow direction are not in one plane, but rather disposed in planes successive in a step-like manner (cascade version according to FIG. 12), and there is advantageously an overflow weir (18) at the transition from one plane to the subsequent plane and the uppermost plane is disposed at the feed and the lowermost plane at the drain.

Useful materials for the hydraulically sealed crossflow mass transfer trays according to the invention are stainless steels (e.g. 1.4301, 1.4541, 1.4401, 1.4404, 1.4571, 1.4000, 1.4435, 1.4539 inter alia), Hasteloy C4, aluminum, copper, titanium, Monel and synthetic materials, for example KERA, Diabon, PVC, inter alia.

The crossflow mass transfer trays according to the invention are suitable in particular for gas loading factors (=superficial gas velocity·(square root of the gas density)) in the range from 0.1 to 3 $(Pa)^{0.5}$ and for liquid hourly space velocities in the range from 0.001 to 10 $m^3/(m^2 \cdot h)$. They may be operated either under atmospheric pressure, under reduced pressure or under elevated pressure.

It will be appreciated that crossflow mass transfer trays according to the invention may be used as the sole internals in a separating column. However, they may also be used in combination with other tray types (e.g. dual-flow trays and/or valve trays) and/or in combination with internals other than trays (e.g. structured packings and/or random packings) within a separating column. Separating columns comprising crossflow mass transfer trays according to the invention are suitable for thermal separating processes of any kind.

In this document, dual-flow trays refers to sieve trays without a drain segment. These are plates having simple passages (holes, slots, etc.), which are frequently also referred to as trickle sieve trays.

The absence of drain segments (downcomers) results in the rising gas and the reflux liquid falling in the separating column flowing in the opposite direction through the same passages of the tray.

The cross section of the passages is adapted to the loading of the column in a manner known per se. Where it is too small, the rising gas flows at such a high rate through the passages that the liquid rising in the column is entrained substantially without any separating action. When the cross section of the passages is too large, rising gas and falling liquid pass each other by substantially without any exchange and the tray is at risk of running dry. In other words, the working range for dual-flow trays is defined by two limiting points. A minimum limiting rate has to be present so that a certain liquid layer is maintained on the tray, in order to allow the tray to work.

The upper limit is defined by the flood point when the rate leads to accumulation of the liquid on the trickle sieve trays and trickle-through is prevented. Within the normal working range, the liquid rising in the separating column trickles in drops from dual-flow tray to dual-flow tray, i.e. the continuous gas phase between the trickle sieve trays is interspersed by a dispersed liquid phase. Some of the drops striking the trickle sieve tray are atomized.

In general, each dual-flow tray, and likewise each mass transfer tray according to the invention, is connected flush to the column walls. However, there are also embodiments in which there is an intermediate space between column wall and tray which is only partially interrupted by bridges. In addition to the actual passages, dual-flow trays generally also have orifices which facilitate, for example, securing of the tray to support rings or the like (cf., for example, DE-A 10159823).

Dual-flow trays which can be used for the purposes of this document are described, for example, in Techrische Fortschrittsberichte, Vol. 61, Grundlagen der Dimensionierung von Kolonnenböden, pages 196 to 211, Verlage Theodor Steinkopf, Dresden (1967) and in DE-A 10230219.

In this document, valve trays refer to crossflow trays which have tray drillholes having limited-stroke plate, ballast or lifting valves (floating flap) which adapt the size of the vapor passage orifice to the particular column loading. The rising gas stream is deflected, flows parallel to the tray into the accumulated reflux liquid and forms a froth layer. Drainpipes equipped with weirs conduct the reflux from tray to tray. Frequently, they have double-flow configurations. However, they may also have triple- and multiflow (for example octuple-flow) configuration. In general, it is advantageous to increase the directions of flow with the column diameter.

The crossflow mass transfer trays according to the invention are suitable in particular for carrying out a process of fractional condensation of an acrylic acid-containing product gas mixture of a heterogeneously catalyzed partial gas phase oxidation of $C_3$-precursors of acrylic acid with molecular oxygen in a separating column according to DE-A 19924532 which, from bottom to top, comprises first dual-flow trays and then crossflow mass transfer trays according to the invention.

The term "$C_3$ precursors" of acrylic acid encompasses those chemical compounds which are obtainable in a formal sense by reducing acrylic acid. Examples of known $C_3$ precursors of acrylic acid include propane, propene and acrolein. However, the $C_3$ precursors also include compounds such as propionaldehyde or propionic acid. Starting from these, the heterogeneously catalyzed partial gas phase oxidation using molecular oxygen is at least partially an oxidative dehydrogenation.

In the relevant heterogeneously catalyzed partial gas phase oxidations, the $C_3$ precursors of acrylic acid specified, generally diluted with inert gases, for example nitrogen, CO, $CO_2$, inert hydrocarbons and/or steam, are passed over transition metal mixed oxide catalysts in a mixture with molecular oxygen at elevated temperatures and also optionally elevated pressure, and oxidatively converted to an acrylic acid-containing product gas mixture.

Typically, the acrylic acid-containing product gas mixture of a heterogeneously catalyzed partial gas phase oxidation of $C_3$ precursors of acrylic acid with molecular oxygen over solid-state catalysts has the following composition:

from 1 to 30% by weight of acrylic acid,
from 0.05 to 10% by weight of molecular oxygen,
from 1 to 30% by weight of water,
from 0 to 5% by weight of acetic acid,
from 0 to 3% by weight of propionic acid,
from 0 to 1% by weight of maleic acid and/or maleic anhydride,
from 0 to 2% by weight of acrolein,
from 0 to 1% by weight of formaldehyde,
from 0 to 1% by weight of furfural,
from 0 to 0.5% by weight of benzaldehyde
from 0 to 1% by weight of propene, and a remainder of inert gases, for example nitrogen, carbon monoxide, carbon dioxide, methane or propane.

The gas phase oxidation itself may be carried out as described in the prior art. Starting from propene, the gas phase oxidation may be carried out, for example, in two successive oxidation stages, as described in EP-A 700714 and EP-A 700893. However, it will be appreciated that the gas phase oxidations cited in DE-A 19740253 and DE-A 19740252 may also be applied.

In general, the temperature of the product gas mixture leaving the gas phase oxidation is from 150 to 350° C., frequently from 200 to 300° C.

The hot product gas mixture is then advantageously firstly cooled in a quench system by direct cooling to a temperature of from 100 to 180° C., before it is conducted together with the quench liquid used into the lowermost section (the bottom) of the separating column according to the invention comprising the crossflow mass transfer trays according to the invention for the purposes of fractional condensation. The working pressure in the column is generally from 0.5 to 5 bar, frequently from 0.5 to 3 bar and in many cases from 0.5 to 2 bar.

The quench apparatus used may be any apparatus known from the prior art for this purpose (for example spray scrubbers, Venturi scrubbers, bubble columns or other apparatus having sprayed surfaces), although preference is given to using Venturi scrubbers or spray coolers. Preference is given to using a cocurrent apparatus (for example an impingement plate jet). To indirectly cool or heat the quench liquid, in particular on startup, it is conducted over a heat transferor or heat exchanger. In this regard, all common heat transferors or heat exchangers are suitable. Preference is given to tube bundle heat exchangers, plate heat exchangers and air coolers. Useful cooling media are air in the case of appropriate air coolers and cooling liquids, in particular water, in the case of the other cooling apparatus.

An example of a useful quenching liquid is the bottom liquid from the fractional condensation according to the invention or a mixture of bottom liquid and condensate resulting from cleavage of a portion of the bottom liquid and admixed with polymerization inhibitor. In other words, it is possible, if required, to dissociate the acrylic acid oligomers, which have been formed by Michael addition in a reversible manner and are present in a portion of the bottom liquid continuously withdrawn from the separating column according to the invention by the action of elevated temperatures (from 130 to 250° C.), optionally with the addition of acidic or basic dissociation catalysts under reduced pressure (e.g. from 100 or 200 to 500 mbar) to give acrylic acid. The acrylic acid which is released in vaporous form is advantageously condensed, admixed with polymerization inhibitor (e.g. phenothiazine in acrylic acid removed in pure form) and, combined with the remaining bottom liquid withdrawn, used as quench liquid. The temperature of the quench liquid after leaving the abovementioned heat exchanger is generally from 100 to 150° C. The introduction point for the mixture of quenched product gas mixture from the catalytic gas phase oxidation and quench liquid used into the separating column according to the invention is in the bottom zone of this column which advantageously comprises an integrated centrifugal drop separator and is separated by a first chimney tray from the lowermost dual-flow trays.

The chimney tray simultaneously functions as a collecting tray from which condensate is continuously withdrawn and conducted into the bottom zone and/or into the quench zone. Above the first chimney tray is mounted a first series of generally equidistant dual-flow trays in the separating column which are completed by a second chimney tray (collecting tray). Crude acrylic acid which normally has a purity of ≧95% by weight is continuously withdrawn as a medium boiler fraction from this second collecting tray in the sidestream. Advantageously, this crude acrylic acid will be fed to further distillative and/or crystallizative further purification stages and at least a portion of the bottom liquids and/or mother liquors occurring in the distillation (rectifications) and/or crystallizations will be recycled into the separating column according to the invention below the second collecting tray, but above the first.

According to the invention, the crude acrylic acid withdrawn as a medium boiler fraction will advantageously be fed to a crystallization for the purpose of further purification. The crystallization process to be used is subject to no restriction. The crystallization can be carried out continuously or batchwise, in one or more than one stage, to any desired degrees of purity. If required, water may be added to the crude acrylic acid to be purified by crystallization in advance of the crystallization (this then generally contains, based on the amount of acrylic acid present, up to 10% by weight, usually up to 5% by weight, of water).

It is surprising that esterification grade acrylic acid (purity $\geq$98% by weight) can be achieved by only a single crystallization stage. Advantageously, this crystallization stage is implemented as a suspension crystallization, as described in column 10 of DE-A 19924532. The acrylic acid crystals formed in the suspension crystallization have a cubic to cuboidal appearance. The length (L) to thickness (T) ratio is customarily in the range from L:T=1:1 to L:T=6:1, preferably in the range from 1:1 to 4:1, and more preferably in the range from 1.5:1 to 3.5:1. The thickness T of the crystals is customarily in the range from 20 to 600 µm, often from 50 to 300 µm. The length L of the crystals is customarily in the range from 50 to 1500 µm, often from 200 to 800 µm. When the suspension crystals are separated from the remaining mother liquor by means of a melt-washing column (for example one according to DE-A 10223058), it is even possible to obtain superabsorbent grade acrylic acid (purity $\geq$99.7% by weight) by a single crystallization stage, i.e. acrylic acid which is suitable for preparing water-superabsorbing polyacrylates. In this case, the entire amount of the mother liquor removed is advantageously recycled into the separating column according to the invention.

However, the crystallization may also be carried out as a fractional falling-film crystallization, as recommended by EP-A 616998. This may comprise, for example, two purification stages (falling-film crystallizers suitable in this context may comprise: for example, from 1000 to 1400 crystallization tubes of length from 10 to 15 m and external diameter from 50 to 100 mm). The mother liquor removed in the second purification stage is advantageously recycled into the first purification stage. The mother liquor removed in the first purification stage is advantageously fully recycled into the separating column according to the invention. The pure product of the first purification stage may be fully or only partly fed to the second purification stage. When only part is fed, the remainder will generally be mixed with the pure product of the second purification stage to give the then ready-to-use end product.

According to the invention, a portion of the crude acrylic acid withdrawn from the second collecting tray will advantageously be fed to the dual-flow tray disposed below this collecting tray. Mother liquor will generally also be fed to this tray. Before it is fed, the mother liquor will generally be heated to a temperature which approximately corresponds to the withdrawal temperature of the crude acrylic acid.

Above the second collecting tray, there is firstly a second series of advantageously equidistant dual-flow trays which are then superseded by the crossflow mass transfer trays according to the invention which are advantageously likewise arranged equidistantly. The uppermost dual-flow tray is frequently configured as a distributor tray. In other words, it has, for example, overflow channels with a serrated overflow.

The crossflow mass transfer trays according to the invention are completed by a third chimney tray (collecting tray).

Above the third collecting tray there are valve trays, preferably double-flow. The principle of valve trays and also of valve trays which can be used according to the invention can be found, for example, in Technische Fortschrittsberichte, Volume 61, Grundlagen der Dimensionierung von Kolonnenböden, p. 96 to 138. Their substantial characteristic is that they provide a passage appropriate to the particular loading to the vapor flowing through over a wide range of loading. According to the invention, preference is given to using ballast trays. In other words, there are cages having orifices closed by weights in the orifices of the tray. According to the invention, particular preference is given to VV12 valves from Stahl, DE, Viernheim. In the valve tray zone, substantially water condenses, and also components less volatile than water. The resulting condensate is referred to as acid water.

Acid water is continuously withdrawn from the third collecting tray. A portion of the water withdrawn is recycled into the column at the uppermost of the crossflow mass transfer trays according to the invention. Another portion of the acid water withdrawn is cooled by indirect heat exchange, and, advantageously split, likewise recycled into the separating column according to the invention. A portion is recycled into the separating column according to the invention at the uppermost valve tray (at a temperature of from 12 to 22° C., preferably from 12 to 17° C.) and the other proportion at a valve tray disposed approximately halfway between the third collecting tray and the uppermost valve tray (at a temperature of from 18 to 32° C., preferably from 18 to 25° C.).

Part of the cooling is effected by conducting the acid water through the propylene evaporator, in order to convert propylene for the heterogeneously catalyzed gas phase oxidation, which has been stored in liquid form, into the gas phase.

Components which are more volatile than water are removed in gaseous form at the top of the separating column according to the invention and normally at least partially recycled as diluent gas into the gas phase oxidation. In order to avoid condensation in the cycle gas compressor, the offgas is superheated beforehand by indirect heat exchange. The nonrecycled portion of the offgas is normally fed to incineration.

For the purpose of polymerization inhibition, a solution of p-methoxyphenol=MEHQ in the pure product and optionally in addition a solution of phenothiazine in the pure product are fed to the uppermost of the hydraulically sealed crossflow mass transfer trays according to the invention. This solution is also used for pure product stabilization.

In addition, a solution of phenothiazine (=PTZ) in the pure product is fed approximately in the middle of the column section equipped with the hydraulically sealed crossflow mass transfer trays according to the invention.

In principle, the formation of acid water may also be practiced outside the separating column according to the invention. In this case, substantially water will advantageously be condensed out of the low boiler gas stream leaving the top of the column by direct cooling in an internal-free or internal-containing zone by means of a second quenching liquid. The resulting condensate is in turn the acid water. A portion of acid water will then sensibly be recycled to the top of the column to increase the separating performance there. A further portion of the acid water is advantageously discharged and is disposed of (for example incinerated) and the remaining portion of the acid water is customarily cooled indirectly in an external heat exchanger and used as the second quenching liquid. Components of the low boiler stream which are more volatile than water again form offgas which is normally at least partially recycled as cycle gas into the gas phase oxidation.

The dual-flow trays in the process according to the invention preferably extend within the separating column according to the invention to approximately the level in the separating column, viewed toward the top of the column, from which the acrylic acid contents of the reflux liquid are ≦20% by weight, based on the weight of the reflux liquid.

The number of dual-flow trays for the separating process according to the invention is generally from 25 to 45. Their orifice ratio is advantageously from 15 to 25%. The passages of the dual-flow trays to be used according to the invention are preferably circular holes having a uniform diameter. The latter is preferably from 10 to 20 mm. If required, the hole diameter in the separating column according to the invention may be narrowed or widened from top to bottom and/or the number of holes may be reduced or increased (for example the hole diameter may be a uniform 14 mm and the orifice ratio from top to bottom may increase from 17.4% to 18.3%). However, the number of holes over all dual-flow trays may also be constant in accordance with the invention. The circular holes are also preferably arranged uniformly over the individual dual-flow trays in strict triangular pitch (cf. DE-A 10230219).

Also, the stamping burr of the passages stamped out of the dual-flow trays to be used according to the invention in the separating column according to the invention preferably points downward (this reduces undesired polymer formation).

According to the invention, it is sensible when the number of dual-flow trays used for the process according to the invention corresponds to from about 10 to 15 theoretical plates.

The number of hydraulically sealed crossflow mass transfer trays according to the invention following the dual-flow trays in the separating column according to the invention will generally be from 30 to 50. According to the invention, their orifice ratio will advantageously be from 5 to 25%, preferably from 10 to 20% (the orifice ratio quite generally corresponds to the percentage contribution of the passage cross sections to the total cross section; in the case of the crossflow mass transfer trays according to the invention it is advantageously quite generally within the abovementioned range).

According to the invention, preference is given to using single-flow crossflow mass transfer trays according to the invention.

In general, the number of hydraulically sealed crossflow trays according to the invention for the process according to the invention will be such that it corresponds to from about 10 to 30, frequently 25, theoretical plates.

Both the hydraulically sealed crossflow trays according to the invention and the valve trays to be used for the process according to the invention have at least one downcomer. They may both either have single-flow or multiflow, e.g. double-flow, configuration. In the single-flow configuration, they may also have more than one downcomer. In general, the upcomers of the valve trays are also hydraulically sealed.

Otherwise, the hydraulically sealed crossflow trays according to the invention, apart from the orientation of the transport slots, may have the same configuration and arrangement of passages, chimneys and also hoods as in the existing Thormann trays.

The polymerization inhibition of the quench system for the product gas mixture of the gas phase oxidation is effected both via the polymerization inhibitors present in the bottom liquid used for quenching and the other polymerization inhibitors present in any dissociation condensate also used for quenching.

As already mentioned, it is generally advantageous to carry out the cleavage with the addition of an inorganic salt whose addition to an aqueous solution of a strong Brönsted acid shifts the pH of the aqueous solution into the alkaline range, as recommended, for example, by DE-C 2407236. Based on the amount of bottom liquid to be subjected to dissociation, the amount of basic dissociation catalyst to be added will generally be from 0.1 to 5% by weight. Examples of dissociation catalysts which are suitable according to the invention include $KOH$, $K_2CO_3$, $KHCO_3$, $NaOH$, $Na_2CO_3$, $NaHCO_3$, $LiOH$, $Li_2CO_3$ and $CaCO_3$. In other words, useful dissociation catalysts are in particular the alkali metal and/or alkaline earth metal salts of weak inorganic or organic Brönsted acids, for example phosphoric acid, boric acid, carbonic acid, formic acid or acetic acid. In other words, useful dissociation catalysts are therefore in particular alkali metal and/or alkaline earth metal phosphates, borates, carbonates, hydrogencarbonates, formates and acetates.

The dissociation catalysts will preferably be selected in such a way that they are soluble in the bottom liquid under the dissociation conditions. According to U.S. Pat. No. 4,293,347, the presence of dialkyl phthalates also has an advantageous effect on the relevant dissociation. In general, an integrated dissociation is carried out at a pressure of ≦1 bar and at a temperature of from 130 to 250° C.

Advantageously, the pressure of the dissociation is from 25 to 600 mbar, preferably from 100 to 300 mbar. The dissociation temperature is advantageously from 140 to 230° C., preferably from 160 to 200° C. When the dissociation is carried out continuously (the process according to the invention is advantageously carried out continuously), the residence time in the dissociation reactor should be from 0.5 to 4 hours. The dissociation to be carried out according to the invention can be carried out in a simple manner in a forced circulation-decompression evaporator. As described in U.S. Pat. No. 5,733,075 and also in DE-A 4101879, the dissociation of acrylic acid oligomers can in principle be carried out without adding specialized acidic or basic dissociation catalysts. These include dodecylbenzenesulfonic acid, p-toluenesulfonic acid, sulfuric acid, the solid acidic catalysts of JP-A 3-178949 or the inorganic salts already mentioned. In general, the dissociation reactor is flowed through by air during the dissociation.

In the process according to the invention, the involatile residue remaining in the dissociation reactor is generally disposed of, for example incinerated. If required, the addition of an organic solvent, for example methanol, maintains the volatile dissociation residue in the fluid state.

The temperature in the bottom of the column according to the invention is typically from 90 to 150° C., whereas the temperature at the uppermost hydraulically sealed crossflow tray according to the invention is typically from 40 to 95° C., frequently from 60 to 90° C. The withdrawal temperature of the crude acrylic acid is usually from 80 to 110° C.

The use of the mass transfer trays according to the invention results in an improved separating action which is revealed by a reduced acrylic acid content in the acid water. It also facilitates more stable operation of the separating column according to the invention, which is revealed in a lower pressure drop variation per plate.

This allows purities of the crude acrylic acid withdrawn via the cyclic stream of ≧96.6% by weight to be obtained. In general, the following secondary component contents are present in the crude acrylic acid:

≦0.9% by weight of acetic acid,
≦1.13% by weight of water,
≦0.025% by weight of formic acid,
≦0.0015% by weight of formaldehyde,
≦0.01% by weight of acrolein,
≦0.075% by weight of propionic acid,
≦0.42% by weight of furfurals,
≦0.025% by weight of allyl acrylate,
≦0.0001% by weight of allyl formate,
≦0.5% by weight of benzaldehyde,
≦0.17% by weight of maleic anhydride,
≦0.5% by weight of diacrylic acid,
≦0.025% by weight of phenothiazine and
≦0.014% by weight of MEHQ.

Over and above these, no other secondary component contents can generally be detected. The process according to the invention generally requires no introduction of energy. Rather, the product gas mixture contributes a sufficient energy content.

EXAMPLE AND COMPARATIVE EXAMPLE

1. Comparative Example (the Steady State is Described)

A heterogeneously catalyzed gas phase oxidation of propylene provided a product gas mixture at a temperature of 270° C. having the following composition:
10.2874% by weight of acrylic acid,
0.2137% by weight of acetic acid,
3.8823% by weight of water,
0.0230% by weight of formic acid,
0.0866% by weight of formaldehyde,
0.1590% by weight of acrolein,
0.0024% by weight of propionic acid,
0.0030% by weight of furfural,
0.0013% by weight of allyl acrylate,
0.0003% by weight of allyl formate,
0.0022% by weight of benzaldehyde,
0.1182% by weight of maleic anhydride,
0.0098% by weight of benzoic acid,
1.9668% by weight of $CO_2$,
0.6426% by weight of CO,
0.6021% by weight of propane,
0.3199% by weight of propylene,
3.3350% by weight of $O_2$, and
78.3442% by weight of $N_2$.
No further components were detected.

The product gas mixture (190363 kg/h) was cooled in a spray cooler operated in cocurrent by direct cooling to a temperature of 136.4° C.

The liquid used for direct cooling (quench liquid) was a mixture of bottom liquid which was withdrawn from the separating column described hereinbelow, and polymerization-inhibited dissociation condensate (obtained by dissociation of a portion of the quench liquid, condensation of the resulting gas phase and addition of polymerization-inhibited pure product).

The composition of the quench liquid was as follows:
16.0276% by weight of acrylic acid,
0.0861% by weight of acetic acid,
0.3278% by weight of water,
0.0045% by weight of formic acid,
0.0004% by weight of formaldehyde,
0.0070% by weight of acrolein,
0.0095% by weight of propionic acid,
0.2356% by weight of furfurals,
0.0004% by weight of allyl acrylate,
0.7910% by weight of benzaldehyde,
4.8366% by weight of maleic anhydride,
4.9676% by weight of benzoic acid,
25.7217% by weight of diacrylic acid,
32.9952% by weight of polyacrylic acid (Michael adduct),
1.3116% by weight of phenothiazine,
0.9970% by weight of MEHQ, and
11.6806% by weight of other high-boiling components.

The polymerization-inhibited dissociation condensate (1588 kg/h) had the following composition:
72.0817% by weight of acrylic acid,
0.1114% by weight of acetic acid,
0.4236% by weight of water,
0.0058% by weight of formic acid,
0.0006% by weight of formaldehyde,
0.0090% by weight of acrolein,
0.0122% by weight of propionic acid,
0.3000% by weight of furfural,
0.0006% by weight of allyl acrylate,
1.0000% by weight of benzaldehyde,
6.0000% by weight of maleic anhydride,
5.2295% by weight of benzoic acid,
13.6970% by weight of diacrylic acid,
0.0287% by weight of phenothiazine, and
1.1000% by weight of MEHQ.

A portion (2049 kg/h) of the quench liquid was continuously withdrawn and fed to the dissociation. This was carried out at a pressure of 300 mbar and a temperature of 181.4° C. The dissociated gas left the dissociation apparatus via a centrifugal drop separator at a temperature of 175° C.

The dissociation residue was maintained in the fluid state by adding methanol and fed to incineration.

The remainder of the quench liquid (595399 kg/h) was conducted through a tube bundle heat exchanger and then used at a temperature of 130.7° C. for direct cooling of the product gas mixture.

The mixture of cooled product gas mixture and quench liquid resulting from the direct cooling was conducted into the bottom of the separating column (for the fractional condensation). The height of the separating column was 54.3 m.

The diameter of the separating column in the region of the Thormann trays was 6.5 m and otherwise 6.0 m.

A centrifugal drop separator was integrated into the bottom zone of the column and prevented droplets of the quench liquid from being entrained upward from the bottom zone.

The bottom zone was completed at a column height (like all heights, measured from the column bottom) of 7.80 m by a first collecting tray (chimney tray having 16 approximately uniformly distributed roofed chimneys; chimney diameter: 600 mm; chimney height: 1 m).

The collecting tray had a double-walled configuration with a 2° gradient toward the center and a central takeoff cup and takeoff nozzle (DN~200). The free gas cross section was approx. 30%.

55740 kg/h of reflux liquid were withdrawn from this first collecting tray and conducted into the bottom zone. The composition of this reflux liquid was:
82.0869% by weight of acrylic acid,
0.3204% by weight of acetic acid,
1.0184% by weight of water,
0.0123% by weight of formic acid,
0.0015% by weight of formaldehyde,
0.0131% by weight of acrolein, 0.0556% by weight of propionic acid,
1.2451% by weight of furfurals,
0.0022% by weight of allyl acrylate,
0.0001% by weight of allyl formate,
2.8634% by weight of benzaldehyde,
8.7895% by weight of maleic anhydride,
0.6606% by weight of benzoic acid,
2.6725% by weight of diacrylic acid,
0.0477% by weight of phenothiazine, and
0.2289% by weight of MEHQ.

The temperature was 102.7° C. The pressure was 1.48 bar.

The first of initially 15 dual-flow trays was disposed 2.0 m above the first collecting tray. These dual-flow trays (hole diameter a uniform 14 mm, hole number a uniform 33678, orifice ratio a uniform 18%) were mounted equidistantly at a tray separation of 380 mm. The passages consisted of circular orifices of a uniform diameter of 14 mm and the stamping burr in the separating column pointed downward. The orifice ratio was approx. 20%. The arrangement of the centres of the passage circles followed a strict triangular pitch. The distance between the centres of two neighboring circles was 30 mm.

The fifteenth dual-flow tray was configured as a distributor tray. For this purpose, it comprised two inserted tubes (DN~150) having 40 drain drillholes (diameter 15 mm) per inserted tube.

The first series of dual-flow trays was completed by a second collecting tray (chimney tray having 16 approx. uniformly distributed roofed chimneys; chimney height approx. 1.70 m, central takeoff cup with takeoff nozzles (DN~250), free gas cross section of ~30%) which was mounted 1.50 m above the last dual-flow tray.

From this second collecting tray, crude acrylic acid was continuously withdrawn which had the following composition:
96.6109% by weight of acrylic acid,
0.9% by weight of acetic acid,
1.1219% by weight of water,
0.0250% by weight of formic acid,
0.0015% by weight of formaldehyde,
0.0098% by weight of acrolein,
0.0748% by weight of propionic acid,
0.4141% by weight of furfurals,
0.0025% by weight of allyl acrylates,
0.0001% by weight of allyl formate,
0.1441% by weight of benzaldehyde,
0.1667% by weight of maleic anhydride,
0.4935% by weight of diacrylic acid,
0.0216% by weight of phenothiazine, and
0.0134% by weight of MEHQ.

89638 kg/h of the crude acrylic acid withdrawn at a temperature of 99.5° C. were recycled to the fifteenth dual-flow tray (counted from below).

33152 kg/h of the crude acrylic acid withdrawn at a temperature of 99.5° C. were fed to a falling-film crystallization having two purification stages according to EP-A 616 998. To this end, their temperature was reduced to 29° C. by indirect heat exchange.

The pure product of the first purification stage was fed in its entirety (26940 kg/h) to the second purification stage. Its composition was as follows:
98.9773% by weight of acrylic acid,
0.4552% by weight of acetic acid,
0.2696% by weight of water,
0.0127% by weight of formic acid,
0.0003% by weight of formaldehyde,
0.0019% by weight of acrolein,
0.0425% by weight of propionic acid,
0.0802% by weight of furfural,
0.0005% by weight of allyl acrylate,
0.0279% by weight of benzaldehyde,
0.0323% by weight of maleic anhydride,
0.0955% by weight of diacrylic acid and
0.0042% by weight of phenothiazine.

The mother liquor of the second purification stage was recycled completely to the first purification stage. The mother liquor of the first purification stage was introduced into a tank and recycled from there at a temperature of 90° C. in an amount of 12678 kg/h to the fifteenth dual-flow tray (counted from below). The composition of this recycled mother liquor was as follows:
91.6109% by weight of acrylic acid,
2.0442% by weight of acetic acid,
2.8648% by weight of water,
0.0569% by weight of formic acid,
0.0038% by weight of formaldehyde,
0.0252% by weight of acrolein,
0.1616% by weight of propionic acid,
1.0668% by weight of furfural,
0.0064% by weight of allyl acrylate,
0.3713% by weight of benzaldehyde,
0.4295% by weight of maleic anhydride,
1.2712% by weight of diacrylic acid,
0.0556% by weight of phenothiazine, and
0.0350% by weight of MEHQ.

20475 kg/h of pure product were withdrawn from the second purification stage and had the following composition:
99.709% by weight of acrylic acid,
0.1915% by weight of acetic acid,
0.428% by weight of water,
0.0053% by weight of formic acid,
0.0002% by weight of acrolein,
0.0210% by weight of propionic acid,
0.0100% by weight of furfural,
0.0001% by weight of allyl acrylate,
0.0035% by weight of benzaldehyde,
0.0040% by weight of maleic anhydride,
0.0119% by weight of diacrylic acid, and
0.0005% by weight of phenothiazine.

1991 kg/h of this pure acrylic acid were admixed with PTZ so that a solution resulted which contained 1.5% by weight of dissolved PTZ (inhibitor solution 1).

38 kg/h of this pure acrylic acid were admixed with MEHQ so that a solution resulted which contained 30% by weight of MEHQ (inhibitor solution 2).

10 kg/h of inhibitor solution 1 were used in order to stabilize the condensate of the dissociation. 243 kg/h of the inhibitor solution 1 were used in order to stabilize 18496 kg/h of pure acrylic acid.

In detail, the falling-film crystallization was carried out as follows (cf. FIG. 13). The cooled stream of crude acrylic acid fed to the falling-film crystallization was initially passed over a filter F1 (for the purpose of polymer removal; basket filter having a mesh width of approx. 250 μm) and then conducted into a storage tank B1 (the entire crystallization equipment was manufactured from stainless steel; the storage tank was equipped with a heating device; typical volumes of the storage tank B1 are in the range from 250 to 600 m$^3$; the storage tank B1 is usually unstirred).

From there, the crude acrylic acid was introduced by means of the pump P1 as stream 2 into a storage reservoir B2 of the layer crystallization plant. Since the two-stage layer crystallization is a batchwise process, the first purification stage was charged batchwise with crude acrylic acid (stream 3) from the storage reservoir B2. After partial crystallization of this feed acid, the remaining liquid residual acid and the sweating acid arising from sweating (see the description of the stage sequence hereinbelow) were allowed to run off into the reservoir B3 as stream 9. The impurity-enriched acrylic acid collected in B3 was continuously conveyed via the pump P3 as stream 10 into the tank B6 and recycled from there as stream 11 to the fifteenth dual-flow tray (counted from below) of the separating column. The crystal layer of purification stage R1 remaining on completion of sweating was melted in the crystallizer (primarily by indirect heat introduction) and immediately provided to the second urification stage R2 in the same crystallization apparatus (stream 4). The residual liquid remaining in the purification stage R2 after partial crystallization and sweating was allowed to run off into the reservoir B4 as stream 7 and transferred via the pump 2 as stream 8 into the storage reservoir B2. The crystals of purification stage R2 remaining after sweating were melted in the crystallizer in the same way as in the case of purification stage 1 and afterwards allowed to run off as stream 5 into the collecting reservoir B5 (a substream was used for preparing the inhibitor solution 2).

The pure product of the second purification stage R2 was used in the reservoir S for preparing the inhibitor solution 1 with the addition of the stabilizer 6 (PTZ) (instead of and/or as well as pure acrylic acid, the sidestream S3 and/or the molten crystals of stage R1 (i.e. S2) could also be used for preparing the inhibitor solution 1 and/or 2). The inhibitor solution 1 was added as stream S4 to the molten pure product of purification stage R2 in the reservoir B5 in order to attain the desired stabilizer concentration in the pure acrylic acid. Feed stream 5 was inhibitor solution 1 for the purpose, inter alia, of stabilizing the separating column. The purification stages were performed repeatedly in the sequence R1-R2, R1-R2, R1-R2 . . . ..

Both purification stages R1 and R2 were practiced in two falling-film crystallizers from Sulzer Chemtec AG, which were operated in parallel. Each crystallizer contained 1278 falling-film tubes of length 12 m and external diameter 70 mm. The internal diameter was 67 mm. In the tubes, the acid to be crystallized introduced by a circulation pump flowed as a falling film over the internal surface. It was possible to conduct a heat transfer medium (HTM) likewise introduced via a circulation pump over the external surface of the tubes in the form of a falling film. The HTM used was a water/glycol mixture whose freezing point was <−25° C. (alternatively, a water/methanol mixture could be used whose freezing point was <−25° C.). The maximum charge to both crystallizers is about 120 t of acid/batch to be purified.

The tanks B2 to B5 belonging to the crystallization plant were unstirred, trace-heated (wound around by trace heating tubes which were charged with an appropriate heatable water/glycol mixture) tanks having capacities of from 40 to 150 m$^3$.

The two crystallizers were connected to a heating/cooling system with which the temperature of the heat transfer medium flowing over the external surfaces of the crystallization tubes could be varied as required.

The heating/cooling system consisted essentially of a compression refrigerating plant to deliver the cooling and heating energy, and storage tanks for buffering heat transfer media at different temperatures.

The procedure in the individual purification stage R1 or R2 was as follows. After charging the crystallizer with the acid to be purified and while circulating the acid, the heat transferor was used to start a cooling program. While lowering the temperature, an increasingly thick crystal layer was frozen onto the internal surfaces of the crystallization tubes. When the desired mass of frozen-on acid had been attained, cooling and acid circulation were stopped and the remaining liquid acid was drained off. The temperature of the crystal layers was then increased in a sweating step by increasing the heat transferor temperature. This resulted in partial melting of the crystal layers, predominantly in regions of less pure crystals (i.e. having a melting point lowered by impurities). The resulting sweating liquid was likewise drained out of the crystallizer. The crystal layer remaining after the end of the sweating procedure was then melted by further increasing the temperature of the HTM to above the melting point of the pure acid. Above a certain liquid content, the acid circulation pump ran again. After complete melting of the crystal layers, the melt obtained was drained off as a purified liquid.

The operation conditions typically suitable for the purification stages are reproduced in the following table, and the values in brackets give the range used.

TABLE

|  | Stage R1 | Stage R2 |
|---|---|---|
| Crystallization step |  |  |
| HTM start temperature (° C.) | 0–6 | 1–7 |
|  | (2–4) | (3–5) |
| HTM cooling gradient (K/min) | 0.3–0.7 | 0.3–0.7 |
|  | (0.4–0.6) | (0.4–0.6) |
| Frozen-out mass proportion | 60–80 | 65–85 |
| (% by weight of the charge mass) | (70–80) | (73–83) |
| Sweating step |  |  |
| HTM start temperature (° C.) | 10–14 | 11–15 |
|  | (12–13) | (13–14) |
| HTM heating gradient (K/min) | 0.2–0.6 | 0.2–0.6 |
|  | (0.3–0.5) | (0.3–0.5) |
| Sweated-off mass proportion | 1–10 | 1–10° C. |
| (% by weight of the charge mass) | (4–6) | (4–6° C.) |
| Melting step |  |  |
| HTM temperature (° C.) | 20–40° C. | 20–40° C. |
|  | (30–35° C.) | (30–35° C.) |

The pumps used were centrifugal pumps.

Otherwise, the procedure was as in EP-A 616998.

10.50 m above the second collecting tray was disposed the first of 21 further dual-flow trays of the above-described type (hole diameter again a uniform 14 mm, but number of holes a uniform 32020 and orifice ratio a uniform 17.4%) which were again arranged equidistantly at a tray separation of 380 mm. The last of these 21 dual-flow trays was configured with overflow channels having a serrated overflow as a distributor tray.

800 mm above the last dual-flow tray, the separating column began to expand in a conical manner. 1500 mm above the last dual-flow tray, this expansion ended at a column diameter of 6.50 m.

At this height, i.e. 1.50 m above the last dual-flow tray, an equidistant (tray separation=1500 mm) arrangement began of 28 conventional, single-flow Thormann trays. The Thormann trays were configured in such a way that the arrangement of the transport slots in the hoods of the Thormann trays resulted in an opposite flow direction of the liquid in each case in successive channels in the crossflow direction.

The orifice ratio of the Thormann trays was 14%. The ratio of chimney surface to slot exit surface was 0.8. The chimney height and the height of the overflow weir were 40 mm. The bottom clearance of the bubble-caps (distance between lower edge of slot and tray) was 10 mm. The slot height was 15 mm. The angle between the obliquely angled slot and longitudinal edge of the hood was 30 degrees. The maximum length of the longitudinal edge of the hood was 800 mm. In the peripheral region of the column, the hood length reduced to up to 200 mm for reasons of adaptation to the roundness of the column. The distance between two hoods disposed on one line in the crossflow direction was 66 mm. The drain surface of the downcomer was 1.5% based on the cross sectional area of the tray. The breadth between the two lower longitudinal edges of a hood was 64 mm.

At the height of the uppermost Thormann tray, the separating column began to narrow again in a conical manner. 700 mm above the uppermost Thormann tray, this narrowing was complete and the column diameter had contracted again to 6.00 m.

1.70 m above the uppermost Thormann tray was disposed the third collecting tray (chimney tray having 16 approx. uniformly distributed roofed chimneys, chimney height=1.50 m).

From the third collecting tray, 534403 kg/h of acid water having a temperature of 58.1° C. and a pressure of 1.24 bar were withdrawn.

The composition of acid water was:
9.3861% by weight of acrylic acid,
4.4554% by weight of acetic acid,
83.2650% by weight of water,
0.5429% by weight of formic acid,
2.2754% by weight of formaldehyde,
0.0374% by weight of acrolein,
0.0079% by weight of propionic acid,
0.0087% by weight of furfurals,
0.0189% by weight of allyl formate,
0.0002% by weight of benzaldehyde, and
0.0001% by weight of MEHQ.

26618 kg/h of the acid water withdrawn (58.1° C.) were recycled together with 54 kg/h of inhibitor solution 2 (17.6° C.) to the uppermost Thormann tray.

7249 kg/h of the acid water withdrawn were fed to incineration.

300321 kg/h of the acid water withdrawn were recycled at a temperature of 15° C. to the sixth of the valve trays to be described hereinbelow (counted from below).

200214 kg/h of the acid water withdrawn were recycled at a temperature of 12.7° C. to the uppermost of the valve trays to be described hereinbelow.

At the fourteenth Thormann tray (counted from below), 1742 kg/h of inhibitor solution 1 were fed at a temperature of 15.1° C.

2300 mm above the third collecting tray, 11 double-flow valve trays were mounted in an equidistant arrangement (tray separation=500 mm). The height of the drain weir was 35 mm. The orifice ratio was 18% and the sum of the drain surface areas of the downcomers of two successive valve trays was 10% of the column cross sectional area. The valves used were VV12 valves from Stahl, DE, Viernheim.

The pressure at the top of the column was 1.2 bar.

At the top of the column, 164001 kg/h of offgas at a temperature of 14° C. left the separating column and had the following composition:
0.0563% by weight of acrylic acid,
0.0293% by weight of acetic acid,
0.8212% by weight of water,
0.0015% by weight of formic acid,
0.1829% by weight of acrolein,
0.0004% by weight of furfurals,
0.0006% by weight of allyl formate,
2.2830% by weight of $CO_2$,
0.7459% by weight of CO,
0.6989% by weight of propane,
0.3713% by weight of propylene
3.8711% by weight of $O_2$, and
90.9375% by weight of $N_2$.

In an indirect heat exchanger, the offgas was heated to 38° C. and then 97099 kg/h of this offgas were recycled via a cycle gas compressor into the gas phase oxidation as diluent gas and 66902 kg/h of the offgas were fed to incineration.

The operation of the Thormann trays was characterized by variations in the pressure drop of the individual Thormann tray of up to 1 mbar per tray. This resulted in variations in the pressure drop of the dual-flow trays of up to 0.5 mbar per dual-flow tray.

The average pressure drop in the region of the first seven Thormann trays (counted from below) was about 8 mbar per Thormann tray, falling to 5 mbar per Thormann tray with increasing column height.

2. Example (Steady State Operation)

The procedure was as in the comparative example, except that the Thormann trays were configured in such a way that the transport slots of the hoods in successive flow channels in the crossflow direction were each configured in pairs in such a way that the flows of the liquid in two such immediately successive channels were no longer opposed to each other, but rather successive pairs of flow channels conveyed in the same direction, and the flow direction only changed from pair to pair.

In addition, each hood which bordered a change of direction was provided over the entire hood length (maximum 800 mm, minimum 200 mm) in the middle with directing plates of height 100 mm. In addition, the distance between two hoods disposed on one line in the crossflow direction which bordered a change of direction was reduced from 50 mm to 25 mm.

When the composition and amount of product gas mixture of the heterogeneously catalyzed gas phase oxidation were the same and the crude acrylic acid withdrawn from the separating column had substantially the same composition, the acrylic acid content in the acid water fell from 9.3861% by weight to 7.5% by weight which confirmed the improved separating action of the Thormann trays modified according to the invention. At the same time, the pressure drop variations in the region of the Thormann trays modified according to the invention fell from 1 mbar to 0.3 mbar per tray and the pressure drop variations in the region of the dual-flow trays reduced from 0.5 mbar to 0.1 mbar per dual-flow tray. This allowed the separating column to be operated in a substantially more stable manner which was manifested in lower variations of the regulation temperature which was installed on the $45^{th}$ tray from the bottom (when the temperature at tray 45 rose, the acid water reflux into the separating column was increased, and when this temperature fell, less acid water was recycled into the separating column), and variations in the quality of the crude acrylic acid withdrawn were reduced.

The material of the separating column and the trays contained in it consisted of stainless steel of the type 1.4571.

The invention claimed is:

1. A hydraulically sealed crossflow mass transfer tray which is suitable as an internal in separating columns for mass transfer between liquid and gas phases, and has separated channels arranged in parallel to one another which conduct the liquid, and gas passages arranged between the channels which are covered by longer hoods whose two lower longitudinal edges dip into the liquid of the channel and have gas exit slots having directing surfaces which direct the gas exit into the liquid in an oblique direction, in order to generate the direction of the liquid streams in the channels, the longer side of the hood being aligned at right angles to the crossflow direction of the liquid, wherein the directing surfaces of the hoods in at least two consecutive channels in the crossflow directions are aligned in such a way that the liquid in these channels flows in the same direction and the liquid is otherwise conducted in a meandering manner over the totality of the channels.

2. A hydraulically sealed crossflow mass transfer tray as claimed in claim 1, wherein the channels are interrupted by cross-channels at right angles to the channels.

3. A hydraulically sealed crossflow mass transfer tray as claimed in claim 2, wherein the cross-channels have narrowings where two tray regions having opposite flow directions border on one another.

4. A hydraulically sealed crossflow mass transfer tray as claimed in claim 3, wherein the narrowings are formed by, in succession perpendicular to the crossflow direction, correspondingly narrowly arranged gas passages and/or hoods.

5. A hydraulically sealed crossflow mass transfer tray as claimed in claim 1, wherein directing plates which project over the hoods are secured to the upper side of at least some hoods.

6. A hydraulically sealed crossflow mass transfer tray as claimed in claim 5, wherein directing plates are attached at least to the upper side of those hoods which separate tray regions of opposite flow direction.

7. A mass transfer tray as claimed in claim 1, wherein the upper sides of the hoods have, towards at least one of the two ends at the shorter rectangular edges of the hood, a flattening that extends as far as that end.

8. A separating column which comprises at least one hydraulically sealed crossflow mass transfer tray as claimed in claim 1.

9. A separating column which comprises, at least one hydraulically sealed crossflow mass transfer tray as claimed in claim 1 and at least one dual-flow tray.

10. A thermal separating process, which is carried out in a separating column in claim 8 or 9.

11. A process for fractionally condensing an acrylic acid-containing product gas mixture of a heterogeneously catalyzed gas phase partial oxidation of $C_3$-precursors of acrylic acid with molecular oxygen in a separating column comprising hydraulically sealed crossflow mass transfer trays as separating internals, which comprises using a separating column as claimed in claim 8 or 9.

* * * * *